United States Patent [19]

Sucech et al.

[11] Patent Number: 5,149,520

[45] Date of Patent: * Sep. 22, 1992

[54] SMALL SIZED ALPHA ALUMINA PARTICLES AND PLATELETS

[75] Inventors: Steven W. Sucech, Lake Villa, Ill.; John E. Marhanka, Benton, Ark.; Alan Pearson, Murrysville, Pa.

[73] Assignee: Aluminum Company of America, Pittsburgh, Pa.

[*] Notice: The portion of the term of this patent subsequent to Jul. 11, 2006 has been disclaimed.

[21] Appl. No.: 460,844

[22] PCT Filed: Jun. 19, 1989

[86] PCT No.: PCT/US89/02659

§ 371 Date: Jan. 31, 1990

§ 102(e) Date: Jan. 31, 1990

Related U.S. Application Data

[63] Continuation-in-part of Ser. No. 137,159, Dec. 23, 1987, Pat. No. 4,847,064.

[51] Int. Cl.$^5$ .................................................. C01F 7/02
[52] U.S. Cl. ........................................ 423/625; 423/628
[58] Field of Search .............................. 423/625, 628

[56] References Cited

U.S. PATENT DOCUMENTS

| 4,487,756 | 12/1984 | Mizrah et al. | 423/625 |
| 4,585,645 | 4/1986 | Sucech | 423/625 |
| 4,806,333 | 2/1989 | Egerton | 423/625 |
| 4,818,515 | 4/1989 | Ceresa et al. | 423/625 |
| 4,822,592 | 4/1989 | Misra | 423/625 |
| 4,946,666 | 8/1990 | Brown | 423/628 |

FOREIGN PATENT DOCUMENTS

318168 5/1989 European Pat. Off.
62-230614 10/1987 Japan.

Primary Examiner—Wayne A. Langel
Attorney, Agent, or Firm—Glenn E. Klepac

[57] ABSTRACT

A process for producing alpha alumina particles includes steps of precipitating alumina hydrate from an aqueous sodium aluminate solution by treatment with alumina hydrate seed material and alpha alumina promoter particles; and calcining the precipitated alumina hydrate in the presence of a mineralizer. A preferred mineralizer is aluminum fluoride. The process produces alpha alumina particles having a plate-like shape and an average size of less than about 1.5 microns.

20 Claims, 7 Drawing Sheets

FIG. 8

SMALL SIZED ALPHA ALUMINA PARTICLES AND PLATELETS

CROSS-REFERENCE TO RELATED APPLICATIONS

By way of International Application PCT/US89/02659, this application is a continuation-in-part of U.S. patent application Ser. No. 137,159 filed Dec. 23, 1987 (now U.S. Pat. No. 4,847,064 issued Jul. 11, 1989).

TECHNICAL FIELD

The present invention relates to alpha alumina particles and platelets of small particle size and to processes for their production. As used herein, the term "platelets" refers to particles having a plate-like or tabular shape. Alpha alumina particles and platelets are useful as ceramic and abrasive materials.

BACKGROUND OF THE INVENTION

Alpha alumina particles having average particle sizes of less than about 1.5 microns are known in the prior art. It is also known that alpha alumina particles can be made with a plate-like or tabular shape, in particle sizes greater than about 2 microns. However, alpha alumina particles having both plate-like shape and particle sizes below about 1.5 microns are heretofore unknown. As used herein with reference to platelets, the term "particle size" refers to the size of a largest dimension.

It is a principal objective of the present invention to provide alpha alumina particles having a plate-like shape with an average particle size below about 1.5 microns.

A related objective of the present invention is to provide an economical process for production of alpha alumina particles of the type described, which process avoids formation of boehmite gel at an intermediate stage.

Additional objectives and advantages of the present invention will become apparent to persons skilled in the art from the following specification and claims.

SUMMARY OF THE INVENTION

The principal starting material for the process of the present invention is an aqueous aluminate solution, such as the solution obtained from the Bayer process. The aluminate solution contains about 50–400 g/l caustic soda (expressed as $Na_2CO_3$) and about 0.50–0.80 grams $Al_2O_3$ per gram of caustic soda (expressed as $Na_2CO_3$) The term "caustic soda" as used herein refers to sodium hydroxide. The aluminate solution preferably has a caustic soda content of about 140–240 g/l (expressed as $Na_2CO_3$) The solution also preferably contains about 0.60–0.70 grams $Al_2O_3$ per gram of caustic soda (expressed as $Na_2CO_3$). Initial temperature of the solution is about 20°–100° C.

The aluminate solution is treated with alumina hydrate seed material and particles of an alpha alumina promoter, thereby to precipitate alumina hydrate particles containing the promoter. Preferably, the solution is also cooled as the seed material and promoter are added. The promoter preferably comprises about 0.01–10 wt % of the $Al_2O_3$ content in the precipitate, more preferably about 0.01–5 wt % and most preferably about 0.01–1 wt %. Average particle size of the promoter particles is generally less than about 1 micron.

The seed material preferably comprises particles of alumina trihydrate. The alumina trihydrate seed material may be gibbsite, bayerite or mixtures thereof. More preferably, the seed material comprises predominantly gibbsite.

Precipitated alumina hydrate particles containing the promoter are separated from the aluminate solution, dried, and calcined at an elevated temperature of about 900°–1500° C. to produce particles comprising predominantly alpha alumina. The alpha alumina particles produced preferably have an average crystallite size of less than about 1 micron. If the alpha alumina particles are agglomerated, they may be comminuted by grinding to an average particle size of less than about 1 micron.

As used herein, the term "alumina hydrate" refers to $Al_2O_3 \cdot xH_2O$, where x varies from 1 to 3; in other words, the water of hydration varies between 15 and 34.6% by weight of the alumina hydrate as determined by calcination. The expression "alumina trihydrate" refers to $Al_2O_3 \cdot 3H_2P$ or $Al(OH)_3$, also called "aluminum hydroxide". The terms "gibbsite" and "bayerite" refer to different crystalline forms of alumina trihydrate.

Alpha alumina particles produced by the claimed process are useful for making sintered ceramic shapes. The alpha alumina particles are pressed into a green shape and then the green shape is sintered at an elevated temperature of about 1250°–1500° C. A sintering temperature of about 1400° C. is preferred. The sintered ceramic shapes are characterized by high bulk density and relatively small grain size.

In a particularly preferred process of the invention, dried alumina hydrate particles containing the promoter are calcined together with a mineralizer to produce plate-like particles or platelets having an average maximum dimension of less than about 1.5 microns, preferably less than about 1 micron. Some preferred mineralizers are fluorides, chlorides, chlorine, and certain boron compounds. Two preferred fluorides are aluminum fluoride and ammonium fluoride. Three preferred chlorides are aluminum chloride, ammonium chloride, and hydrochloric acid. Some suitable boron compounds are boric acid, boric oxide, sodium borate, and sodium fluoroborate. Aluminum fluoride is particularly preferred because it is effective and adds no other impurities to the product.

The temperature of calcination is generally about 900°–1500° C., preferably about 1200°–1400° C. A suitable product is obtained at a 1300° C. calcination temperature. The mineralizer is generally added to the alumina hydrate in an amount equal to about 0.15-2 wt % of the alumina hydrate, preferably about 0.15–1 wt %. About 0.25 wt % aluminum fluoride is utilized in a particularly preferred embodiment.

DETAILED DESCRIPTION OF A PREFERRED EMBODIMENT

Figure 6:
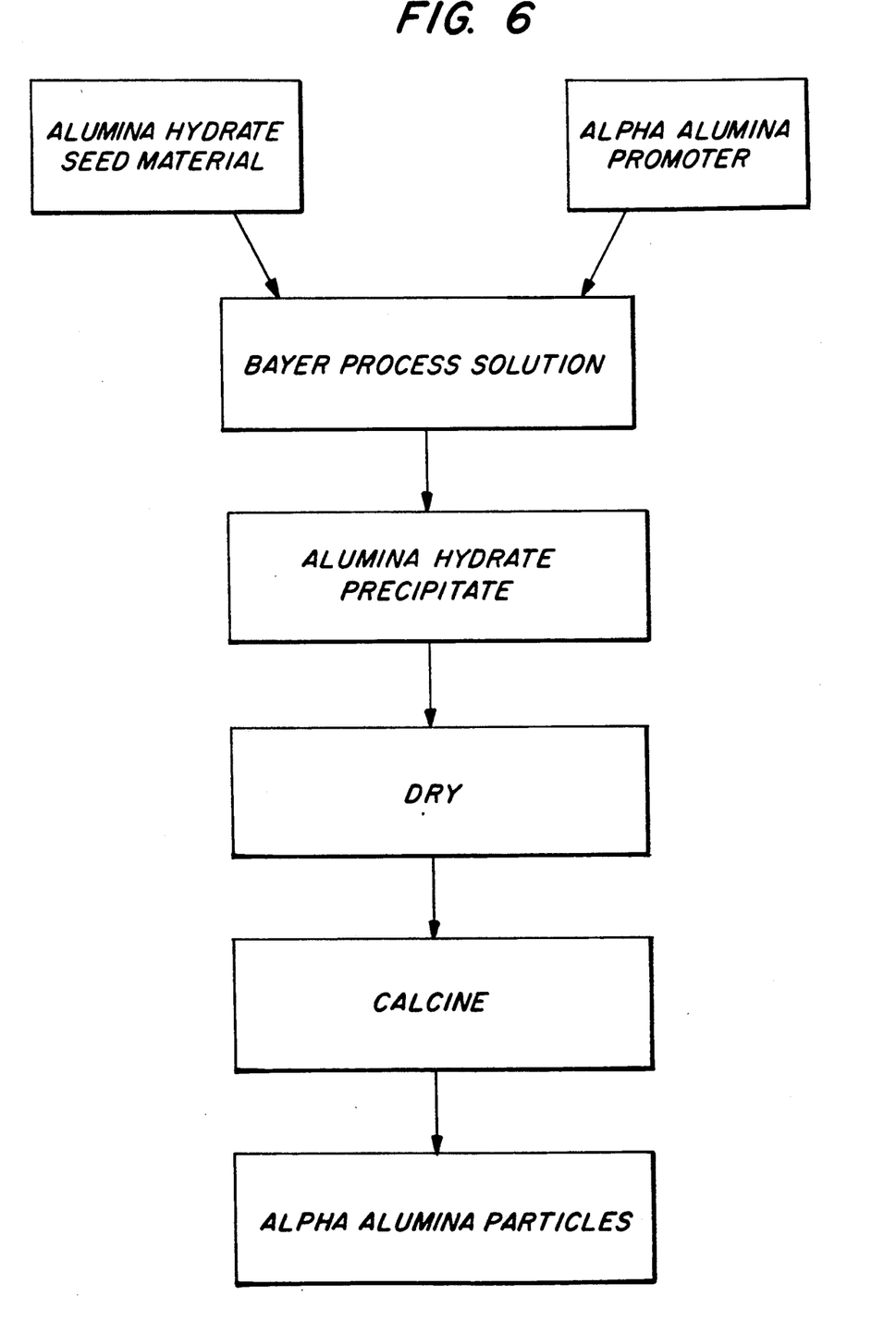
FIG. 6 is a flow sheet diagram of a particularly preferred process.

In accordance with the present invention, alpha alumina promoter particles are added to a Bayer process sodium aluminate solution along with alumina hydrate seed material, thereby to precipitate alumina hydrate particles containing the promoter. A flow sheet diagram of the entire process is shown in FIG. 6. The following examples demonstrate some advantages of such promoter particle addition in the precipitation step.

EXAMPLE 1 (COMPARATIVE)

This Example shows calcination and grinding behavior of an alumina hydrate sample precipitated without addition of alpha alumina promoter particles. The precipitation was conducted by adding 2 g/l of gibbsite seed material having about 1 micron average particle size to a sodium aluminate solution containing approximately 95 g/l $Al_2O_3$ and 150 g/l caustic soda (expressed as sodium carbonate equivalent). A preferred gibbsite seed material is sold by Aluminum Company of America under the trademark HYDRAL 710.

The suspension was agitated and held at 85° C. for 4 hours, then at 65° C. for 20 hours, and finally at 45° C. for 24 hours. These time/temperature conditions were chosen to simulate commercial production of chemical grade gibbsite having low sodium content. The precipitated particles were removed by filtration, then washed and dried. Approximately 100 g/l gibbsite was recovered. The product was composed of agglomerates (4 micron median diameter) of smaller (1-2 micron average diameter) gibbsite crystals with 0.04 wt % $Na_2O$ content.

Figure 1:
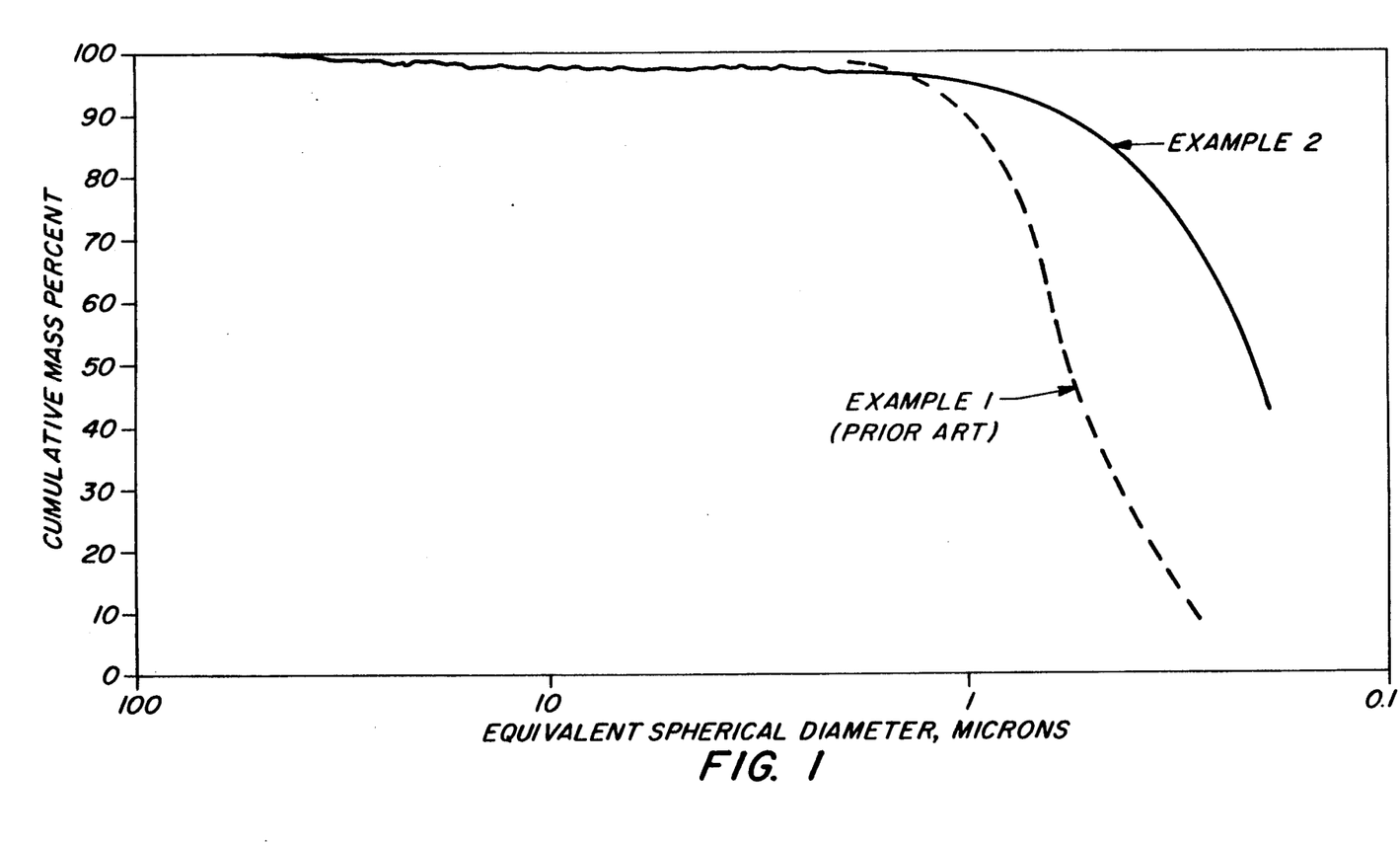
FIGS. 1 and 3–5 are graphs showing the size distribution of alpha alumina particles made in accordance with the prior art and in accordance with the present invention.

The gibbsite material was calcined by heating for 2 hours at 1200° C. and then ball milled for 16 hours. Particle size distribution of the ground product (measured by Micromeritics Sedigraph) is shown in FIG. 1. It can be seen that the median particle size is about 0.6 microns with about 90% of the particles below 1 micron.

EXAMPLE 2

This Example shows the effect of fine particle size alpha alumina promoter addition during precipitation of the gibbsite.

A batch of gibbsite particles was precipitated using 1 g/l of 0.25 micron average particle size gibbsite as precipitation seed material. Sodium aluminate liquor composition was essentially the same as in Example 1, but precipitation was begun at a temperature of 90° C. and the suspension was allowed to cool naturally. Time/temperature history of the precipitation step was as follows:

| Time After Seed Addition (Hours) | Temperature (°C.) |
| --- | --- |
| 0 | 90 |
| 4 | 85 |
| 45 | 60 |
| 125 | 48 |
| 144 | 41 |

Figure 2:
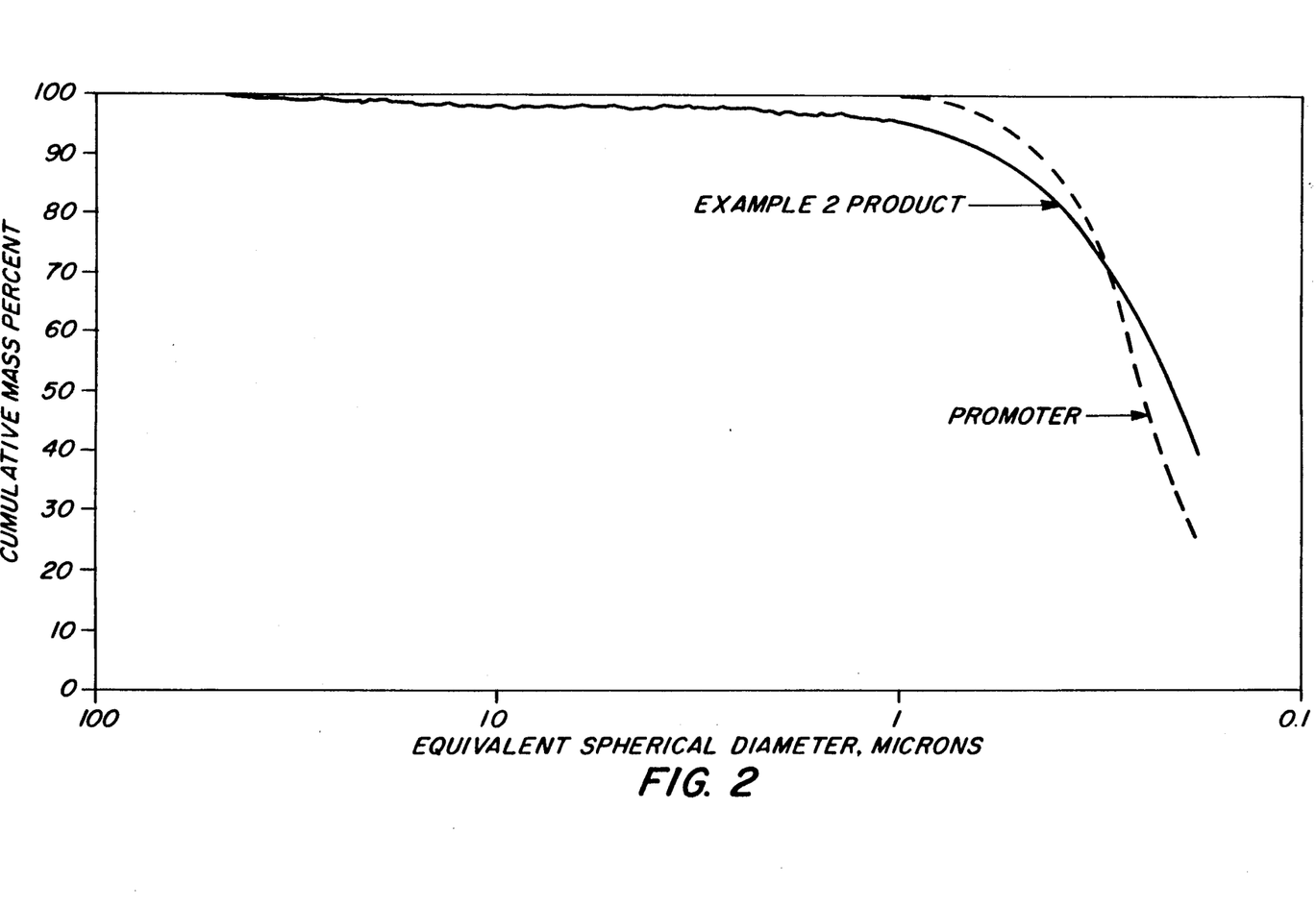
FIG. 2 is a graph showing the size distribution of alpha alumina promoter particles used in practicing the present invention.

During precipitation, 0.6 g/l of alpha alumina promoter particles having the size distribution shown in FIG. 2 were added stepwise to the slurry. The alpha alumina addition was 0.3 g/l at the beginning of precipitation, 0.15 g/l after 4 hours, and 0.15 g/l after 24 hours. This sequence was chosen in an attempt to distribute the promoter particles uniformly among the precipitating alumina particles. Gibbsite yield and $Na_2O$ content were similar to the product of Example 1. The gibbsite product was composed of 25 micron agglomerates with crystal sizes of about 2-5 microns.

This material was calcined for 2 hours at 1200° C., then ground by the procedure of Example 1 but for only 4 hours. Particle distribution of the ground product is shown in FIG. 1. It can be seen that the ground product of Example 2 is much finer than that of Example 1 in spite of the fact it was ground for a shorter period of time. Approximately 95% of the Example 2 product is below 1 micron particle size.

FIG. 2 shows a comparison between particle size distribution of the promoter particles and particle size distribution of alpha alumina produced in Example 2. Surprisingly, the Example 2 product has a higher proportion of particles in the size range below about 0.25 microns than the promoter particles.

EXAMPLE 3

This example shows the effect of changing amounts of promoter particles on the gibbsite precipitation. In all of the tests in this example, precipitations were made with sodium aluminate liquors having approximately the same composition and under the same time/temperature conditions as described in Example 1. The precipitation seed material was a mixture of gibbsite and bayerite particles having about 0.1 micron median particle size, and a seed charge of 1 g/l was used in each test. The amount of alpha alumina promoter used in these tests was varied in the range 0-5 wt % (based on $Al_2O_3$ content in the precipitated product). The alpha alumina promoter had the same particle size distribution as in Example 2, and it was charged incrementally, 40% at the beginning of precipitation, 40% after 4 hours, and 20% after 24 hours. After precipitation, the gibbsite particles were filtered, washed, and dried. In these tests, the washing was not as thorough as in Examples 1 and 2 and consequently, the residual $Na_2O$ content was somewhat higher than in those examples. The precipitated products in Example 3 were agglomerates of 0.5-1.0 micron gibbsite crystals.

Each product was calcined for 2 hours at 1100°-1250° C. and surface area and alpha alumina content were determined for each calcination condition. These data are shown in Table I.

TABLE I

Calcined Properties of Gibbsite/Alpha Alumina Product

Calcined Properties
(After 2 hour Calcination at Indicated Temperature)

| Alpha Alumina Promoter Added (wt %)* | $Na_2O$ (wt %) | Surface Area ($m^2/g$) | | | | Alpha Alumina Content (wt %) | | | |
| --- | --- | --- | --- | --- | --- | --- | --- | --- | --- |
| | | 1100° C. | 1150° C. | 1200° C. | 1250° C. | 1100° C. | 1150° C. | 1200° C. | 1250° C. |
| 0 | 0.14 | 22 | 20 | 12 | 7 | 5 | 36 | 64 | 91 |
| 0.01 | 0.13 | 14 | 10 | 8 | 7 | 70 | 90 | 94 | 96 |
| 0.05 | 0.10 | 12 | 10 | 9 | 7 | 90 | 93 | 94 | 95 |
| 0.20 | 0.21 | 12 | 11 | 10 | 8 | 88 | 91 | 91 | 94 |
| 1.00 | 0.21 | 11 | 11 | 6 | 7 | 94 | 95 | 97 | 96 |
| 5.00 | 0.34 | 14 | 13 | 10 | 7 | 83 | 83 | 88 | 83 |

*Based on $Al_2O_3$ content of the precipitate.

Because of the residual $Na_2O$ content in these samples, anything above 90 wt% alpha alumina is considered fully converted. It can be seen that without promoter addition, a calcination temperature of 1250° C. was required for full conversion to alpha alumina. This is a higher temperature than found necessary in the tests of Example 1, probably because of the higher content of $Na_2O$ which is known to retard transformation to alpha alumina.

Figure 3:
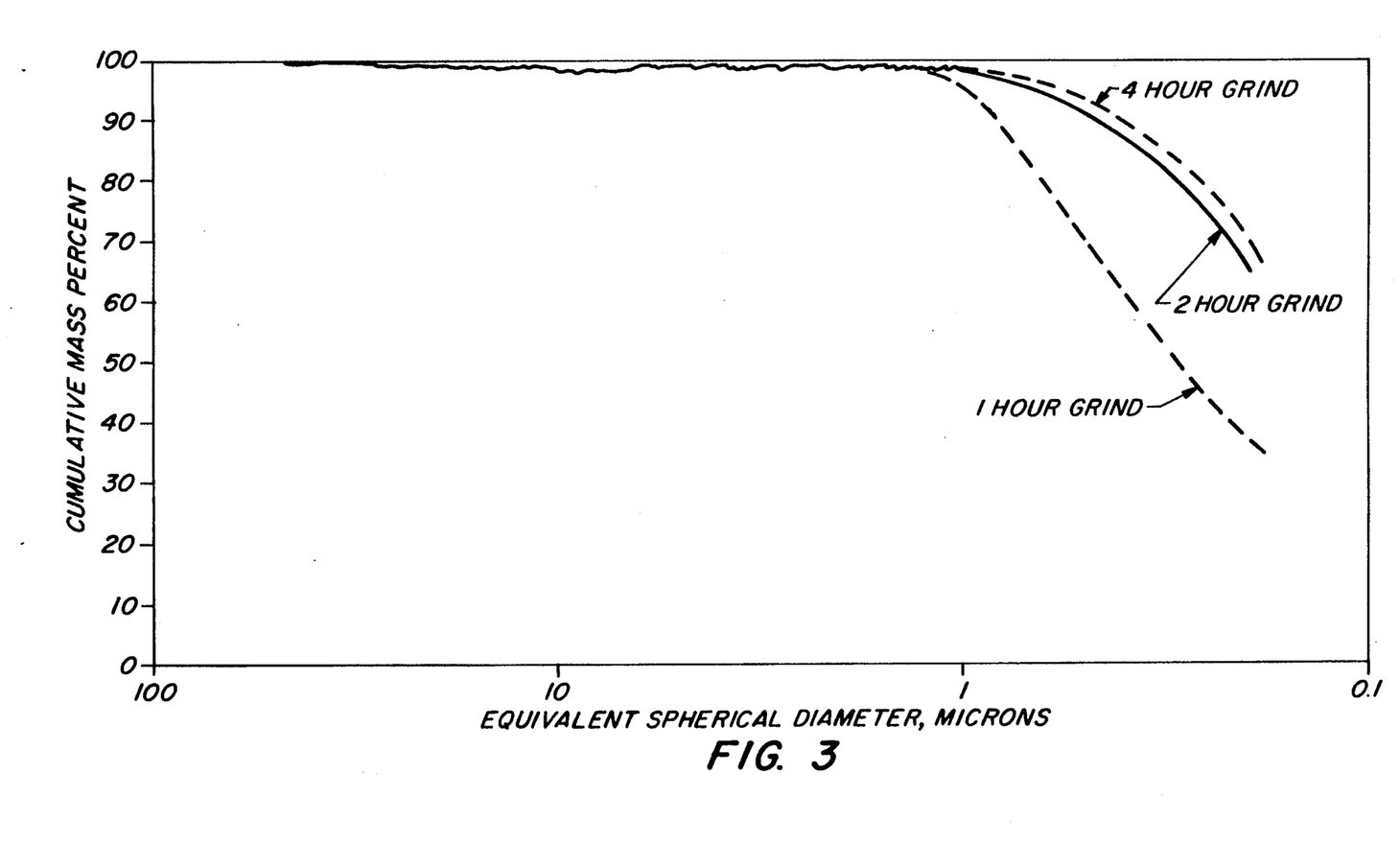
Figure 4:
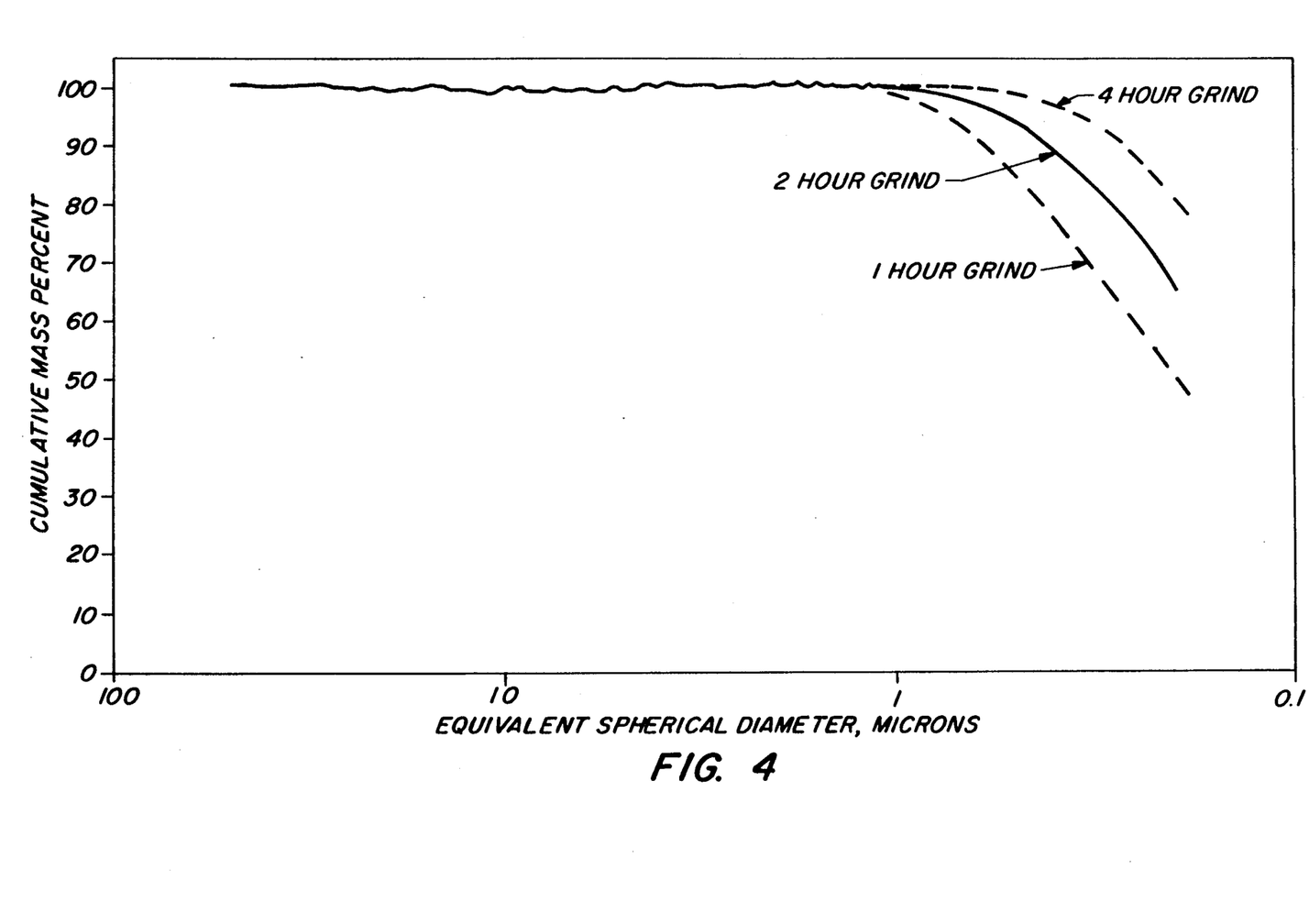

When as little as 0.01 wt % promoter was present, the alpha transformation temperature was reduced significantly. The data also show that by calcination at lower temperatures, higher surface area (finer crystal size) products are attained. FIGS. 3 and 4 show particle size data for some of these materials after dry grinding for 1-4 hours under the same conditions as in Example 1. The particle sizes shown in FIG. 3 were obtained from alumina precipitated by addition of 0.05 wt % alpha alumina promoter particles to the gibbsite seed material. The particle sizes in FIG. 4 were obtained on alumina precipitated by addition of 1.0 wt % alpha alumina promoter particles to the gibbsite seed material. In both cases, the precipitates were calcined at 1125° C. The samples calcined after promoter addition are extremely easy to grind and median sizes below the range of Sedigraph detection (0.2 micron) were attained. Also, these samples contain little or no material above 1 micron average particle size.

Figure 5:
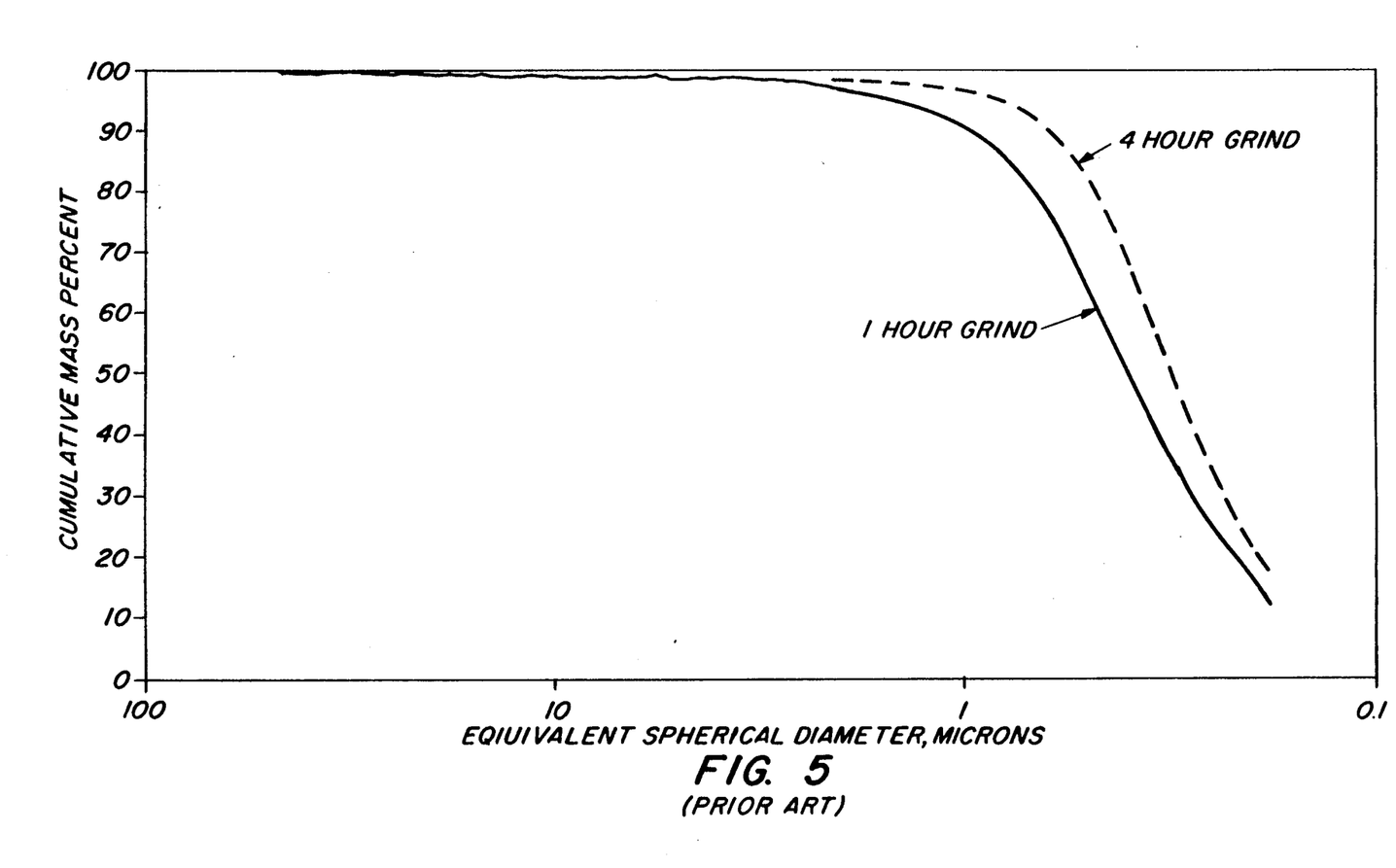

FIG. 5 shows similar data for the unpromoted sample calcined at 1250° C. This material was very easy to grind compared with Example 1 but does not reach the fineness of the promoted samples.

EXAMPLE 4

This example shows that powders prepared by calcination of gibbsite containing the promoter are excellent raw materials for high alumina ceramics. In order to reduce the effect of residual $Na_2O$, some of the gibbsite samples described in Example 3 were thermally decomposed by heating to 425° C., then leached with hot acetic acid at a pH of 5-6 thus lowering their $Na_2O$ content. These materials were calcined for 2 hours at 1125° C. and leached with water. After drying, $Na_2O$ contents were found to be less than 0.01 wt % for all samples.

The samples were then ground for 4 hours, pressed into 1-inch diameter pellets having 0.25-inch thickness at a pressure of 5000 psi in a double piston mold and sintered for 1 hour at 1400° C. After sintering, bulk densities of these samples were found to be 97.5, 96.5, and 95.2% of theoretical density (3.99 g/cc) for promoter levels of 5.0, 0.2, and 0.01 wt %, respectively. For unpromoted alumina, a sintering temperature more than 100° C. higher would be required to achieve comparable densities. One example of an unpromoted alpha alumina is available from Aluminum Company of America under the trademark A-16 SG. Because of the low sintering temperature, the median fired grain size of these samples was only about 1 micron. The combination of high density and small grain size in an alumina ceramic is very desirable for improved mechanical properties and surface finish.

EXAMPLE 5

This example shows the effect of calcining unpromoted gibbsite particles together with an aluminum fluoride mineralizer.

A commercial gibbsite, sold by Aluminum Company of America under the trademark HYDRAL 710, has an average particle size of approximately 1 micron. The gibbsite was calcined at 1300° C. with 0.25 wt % aluminum fluoride in a static furnace. The resulting product consisted of alpha alumina particles having an average crystallite size of approximately 3 microns.

EXAMPLE 6

Example 5 was repeated, using a commercially available gibbsite sold by Aluminum Company of America under the trademark HYDRAL 705. Average particle size of this gibbsite is approximately 0.5 micron. The resulting alpha alumina product had an average crystallite size of about 4.5 microns.

The crystallite sizes obtained in Examples 5 and 6 are typical of commercially available alpha aluminas prepared by calcination in the presence of a mineralizer.

EXAMPLE 7

A gibbsite material having average particle size of about 0.8 micron was prepared by precipitation from sodium aluminate liquor in the presence of alpha alumina promoter particles. The promoter particles had a median particle size of about 0.3 micron and amounted to 1.5 wt % ($Al_2O_3$ basis) of the precipitated sample.

The precipitated promoted gibbsite was dried and then calcined at 1300° C. with 0.25 wt % added aluminum fluoride in a static furnace. The resulting platelets had an average particle size (maximum dimension) of about 1 micron. The platelets had a well defined plate-like appearance with rounded corners.

EXAMPLE 8

The promoted gibbsite of Example 7 was dried out and then calcined with 0.25 wt % added aluminum fluoride mineralizer in a gas-fired rotary kiln having a hot end temperature of 1200°-1250° C. The resulting platelets had an average particle size (maximum dimension) below 1 micron. As shown in the electron microphotograph of FIG. 7 taken at 10,200×magnification, the resulting alpha alumina platelets had a median particle size below 1 micron with well-defined plate-like crystals. The platelets had an average aspect ratio of about 4. As used herein, the term "aspect ratio" is defined as the largest dimension of a particle divided by its smallest dimension (thickness). Aspect ratio of platelets made by the process of the present invention is generally about 2–5, preferably about 3–5.

EXAMPLE 9

Example 8 was repeated, without adding any mineralizer in the calcination step. The resulting product is shown at 15,300× in FIG. 8 as a very fine crystalline product which lacks the well-defined plate-like appearance of FIG. 7.

While the invention has been described in terms of preferred embodiments, the claims appended hereto are intended to encompass all embodiments which fall within the spirit of the invention.

What is claimed is:

1. An economical process for producing particles of alpha alumina comprising the steps of:
   (a) providing an aqueous aluminate solution containing about 50–400 g/l caustic soda and about 0.50–0.80 grams $Al_2O_3$ per gram of caustic soda;
   (b) treating the aqueous aluminate solution with alumina hydrate seed material and particles of an alpha alumina promoter, thereby to participate from the aqueous aluminate solution alumina hydrate particles containing the alpha alumina promoter;
   (c) separating the precipitated alumina hydrate particles from the aqueous aluminate solution;
   (d) drying said alumina hydrate particles; and
   (e) calcining said alumina hydrate particles in the presence of a chlorine- or fluoride-, chloride- or boron-containing mineralizer to produce particles comprising predominantly alpha alumina.

2. The process according to claim 1 wherein said mineralizer is selected from the group consisting of aluminum fluoride, ammonium fluoride, aluminum chloride, ammonium chloride, chlorine, hydrochloric acid, boric oxide, boric acid, and mixtures thereof.

3. The process according to claim 2 wherein said mineralizer comprises aluminum fluoride.

4. The process according to claim 2 wherein said mineralizer comprises about 0.15–2 wt % of the alumina hydrate particles.

5. The process according to claim 1 wherein said alpha alumina promoter comprises about 0.01–10 wt % of the $Al_2O_3$ content of the precipitated alumina hydrate particles.

6. The process according to claim 1 wherein said alumina hydrate seed material comprises alumina trihydrate particles.

7. The process according to claim 1 wherein the aqueous aluminate solution in step (a) has a temperature of about 20°–100° C. and the alumina hydrate particles precipitated in step (b) comprise alumina trihydrate.

8. The process according to claim 7 wherein step (b) further comprises cooling said aqueous aluminate solution.

9. The process according to claim 1 wherein said alpha alumina promoter comprises particles having an average size of less than about 1 micron.

10. A process for producing particles of alpha alumina having a plate-like shape, said process comprising the steps of:
    (a) providing an aqueous aluminate solution containing about 50–400 g/l caustic soda and about 0.50–0.80 grams $Al_2O_3$ per gram of caustic soda;
    (b) treating the aqueous aluminate solution at a temperature of about 40°–100° C. with alumina hydrate seed material and particles of an alpha alumina promoter having an average particle size of less than about 1 micron, thereby to precipitate from the aqueous aluminate solution alumina hydrate particles containing the alpha alumina promoter;
    (c) separating the precipitated alumina hydrate particles from the aqueous aluminate solution;
    (d) drying said alumina hydrate particles; and
    (e) calcining said alumina hydrate particles in the presence of a mineralizer selected from the group consisting of boric oxide, boric acid, aluminum fluoride, aluminum chloride, ammonium fluoride, ammonium chloride, chlorine, hydrochloric acid, and mixtures thereof, thereby producing alpha alumina particles having a plate-like shape.

11. The process according to claim 10 wherein said mineralizer comprises aluminum fluoride.

12. The process according to claim 10 wherein said mineralizer comprises about 0.15–2 wt % of the alumina hydrate particles.

13. The process according to claim 10 wherein said alpha alumina promoter comprises about 0.01–10 wt % of the $Al_2O_3$ content of the precipitated alumina hydrate particles.

14. Alpha alumina particles made by the process of claim 12, said particles having an average particle size of less than about 1 micron.

15. Alpha alumina particles having a plate-like shape and an average size of less than about 1 micron.

Figure 7:
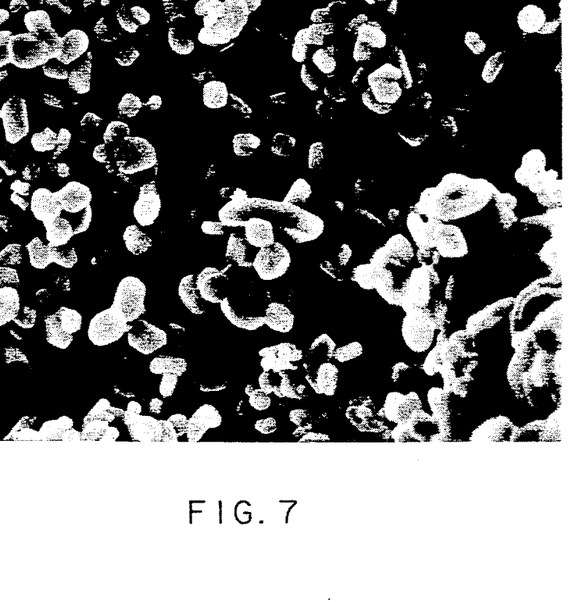
FIG. 7 is an electron microphotograph of alpha alumina particles made in accordance with the present invention.
Figure 8:
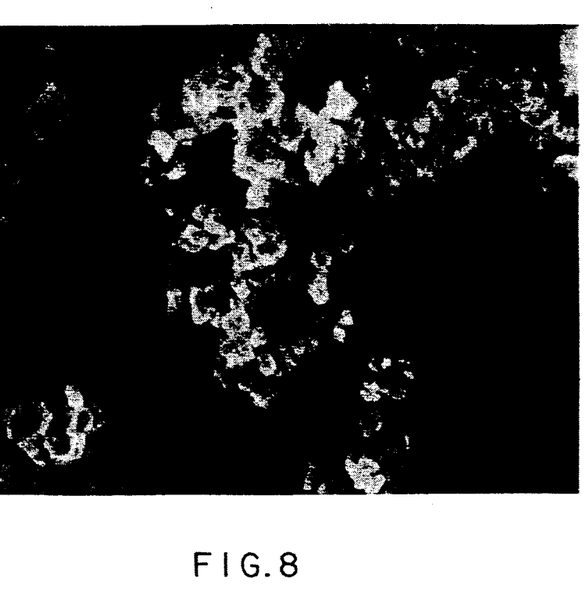
FIG. 8 is an electron microphotograph of alpha alumina particles made by calcining alumina hydrate particles without any mineralizer.

16. Alpha alumina particles in accordance with claim 15, substantially as shown in FIG. 7.

17. Alpha alumina particles in accordance with claim 15, having an aspect ratio of about 2–5.

18. Alpha alumina particles in accordance with claim 15 having a median particle size of less than about 0.6 micron.

19. Alpha alumina particles in accordance with claim 15 having an aspect ratio of about 3–5.

20. Alpha alumina particles in accordance with claim 15 made by a process comprising the steps of:
    (a) providing an aqueous aluminate solution containing about 50–400 g/l caustic soda and about 0.50–0.80 gram $Al_2O_3$ per gram of caustic soda;
    (b) treating the aqueous aluminate solution with alumina hydrate seed material and particles of an alpha alumina promoter, thereby to precipitate from the aqueous aluminate solution alumina hydrate particles;
    (c) separating the precipitated alumina hydrate particles from the aqueous aluminate solution;
    (d) drying said alumina hydrate particles; and
    (e) calcining said alumina hydrate particles in the presence of a chlorine- or fluoride-, chloride- or boron-containing mineralizer to produce particles comprising predominantly alpha alumina.

* * * * *